(12) United States Patent
Mason, Jr. et al.

(10) Patent No.: US 6,255,923 B1
(45) Date of Patent: *Jul. 3, 2001

(54) ARC FAULT CIRCUIT BREAKER

(75) Inventors: Henry H. Mason, Jr., Farmington; Raymond Kelsey Seymour, Plainville, both of CT (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,545

(22) Filed: Jun. 25, 1999

(51) Int. Cl.[7] .................................................. H01H 73/00
(52) U.S. Cl. .............................................. 335/18; 361/42
(58) Field of Search .......................... 335/18; 361/42–51

(56) References Cited

U.S. PATENT DOCUMENTS

| | | | |
|---|---|---|---|
| 3,864,649 | * 2/1975 | Doyle | 335/166 |
| 4,513,268 | 4/1985 | Seymour et al. . | |
| 4,573,259 | 3/1986 | Seymour et al. . | |
| 4,641,216 | 2/1987 | Morris et al. . | |
| 4,641,217 | 2/1987 | Morris et al. . | |
| 4,667,263 | 5/1987 | Morris et al. . | |
| 4,686,600 | * 8/1987 | Morris et al. | 361/42 |
| 4,702,002 | 10/1987 | Morris et al. . | |
| 5,260,676 | * 11/1993 | Patel et al. | 335/18 |
| 5,446,431 | * 8/1995 | Leach et al. | 335/18 |
| 5,483,211 | * 1/1996 | Carrodus et al. | 335/18 |
| 5,818,671 | 10/1998 | Seymour et al. . | |
| 5,982,593 | * 11/1999 | Kimblin et al. | 361/42 |

* cited by examiner

Primary Examiner—Lincoln Donovan
Assistant Examiner—Tuyen T. Nguyen
(74) Attorney, Agent, or Firm—Cantor Colburn LLP; Carl B. Horton

(57) ABSTRACT

An arc fault circuit breaker comprising an electronics portion that is interconnected with a mechanical portion is presented. A plunger arm affixed to the end of a plunger shaft of a solenoid connects the electronics portion with the mechanical portion. A protrusion is provided to assist in assembly of the circuit breaker. The protrusion depends from the plunger arm. An assembler applies a light downward force with one finger on the protrusion and the plunger arm tends to assume a position at right angles to the surface of the printed circuit board. When the electronics portion is connected with the mechanical portion, the plunger arm is properly aligned and it enters into the slot. If the electronics portion is slightly offset, the assembler's finger on the protrusion can move the plunger arm slightly to align the plunger arm. Thus, the invention enables an assembler to hold and guide the plunger arm into the correct position with one hand while assembling the circuit breaker.

6 Claims, 4 Drawing Sheets

ARC FAULT CIRCUIT BREAKER

BACKGROUND OF THE INVENTION

The present invention relates generally to a circuit breaker. More specifically the present invention relates to an arc fault circuit breaker.

Arc fault circuit breakers are well known. These breakers comprise contacts that open upon sensing arcing from line to ground, and/or from line to neutral. Arc fault circuit breakers typically use a differential transformer to measure arcing from line to ground. Detecting arcing from line to neutral is accomplished by detecting rapid changes in load current by measuring voltage drop across a relatively constant resistance, usually a bi-metal resistor.

Components of arc fault circuit breakers are generally assembled into separate compartments as defined by their function. More specifically, mechanical components, e.g., load current carrying and switching components, of each pole are assembled into mechanical compartments, while the current sensing components are assembled into an electronics compartment. In order to connect the compartments, the load current of each pole must be routed from the mechanical compartments into the electronics compartment, through appropriate current sensing devices, and back into the mechanical compartments. Additionally sensing lines, e.g., from the bi-metal resistors, must also be routed from the mechanical compartments into the electronics compartment. Because these circuit breakers sense arc faults, which are essentially short circuits, the connections of the load current carrying components throughout the circuit breaker must be capable of withstanding enormously high surge currents, sometimes in excess of 10,000 amps. The stresses caused by these extremely large surge currents can blow a connection apart that is not manufactured to proper quality standards. This means that during the assemble process, high quality connections, e.g., welds, bolts, or crimps, must be carefully made and inspected in order to survive the extremely high surge currents, and must be completed at a rate that meets the production schedule.

The electronics compartment typically includes a solenoid having a plunger shaft with a right-angle plunger arm attached at one end thereof. During assembly of the circuit breaker, the plunger arm must drop into a slot in the mechanical compartment for activating a trip mechanism during operation. It will be appreciated that since the plunger shaft is cylindrical, both the plunger shaft and the plunger arm attached to it easily rotate. When the electronics compartment is mated with the mechanical compartment, the plunger arm has been known to rotate in such a manner that it wedges between the two compartments.

BRIEF SUMMARY OF THE INVENTION

In an exemplary embodiment of the invention, an arc fault circuit breaker comprises an electronics compartment having current sensing components and a mechanical compartment having load current carrying and switching components. Interconnection between these components is in part provided by a plunger arm, which is attached to one end of a plunger shaft. The plunger shaft extends from a solenoid in the electronics compartment. A protrusion is provided at the top side of the plunger arm, opposite a long end of the arm. This protrusion is used as a guide by an assembler, who may place one finger on the protrusion while holding an electronics compartment during assembly of the circuit breaker. As the assembler applies a light downward force on the plunger arm, the arm tends to assume a position at a right angle to the surface of a printed circuit board in the electronics compartment. When the electronics compartment is mated with the mechanical compartment the plunger arm is thereby properly aligned and it drops into a slot within the mechanical compartment. Thus, the invention enables an assembler to hold and guide the plunger arm during assembly of the circuit breaker.

BRIEF DESCRIPTION OF THE DRAWINGS

Referring now to the drawings wherein like elements are numbered alike in the several FIGS..

DETAILED DESCRIPTION OF THE INVENTION

Figure 1:
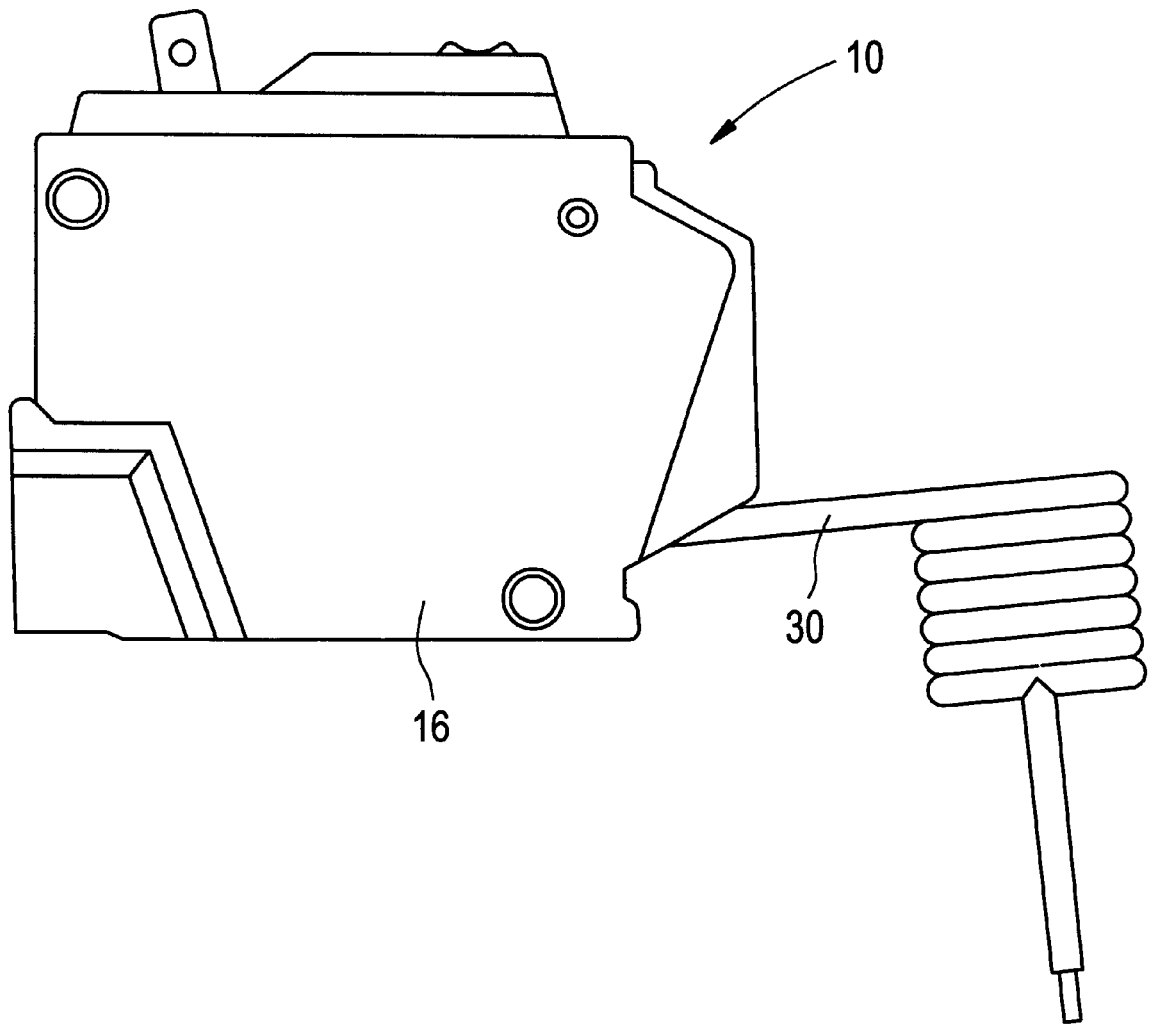
FIG. 1 is a side elevational view of an arc fault circuit interruption circuit breaker in accordance with the present invention.
Figure 2:
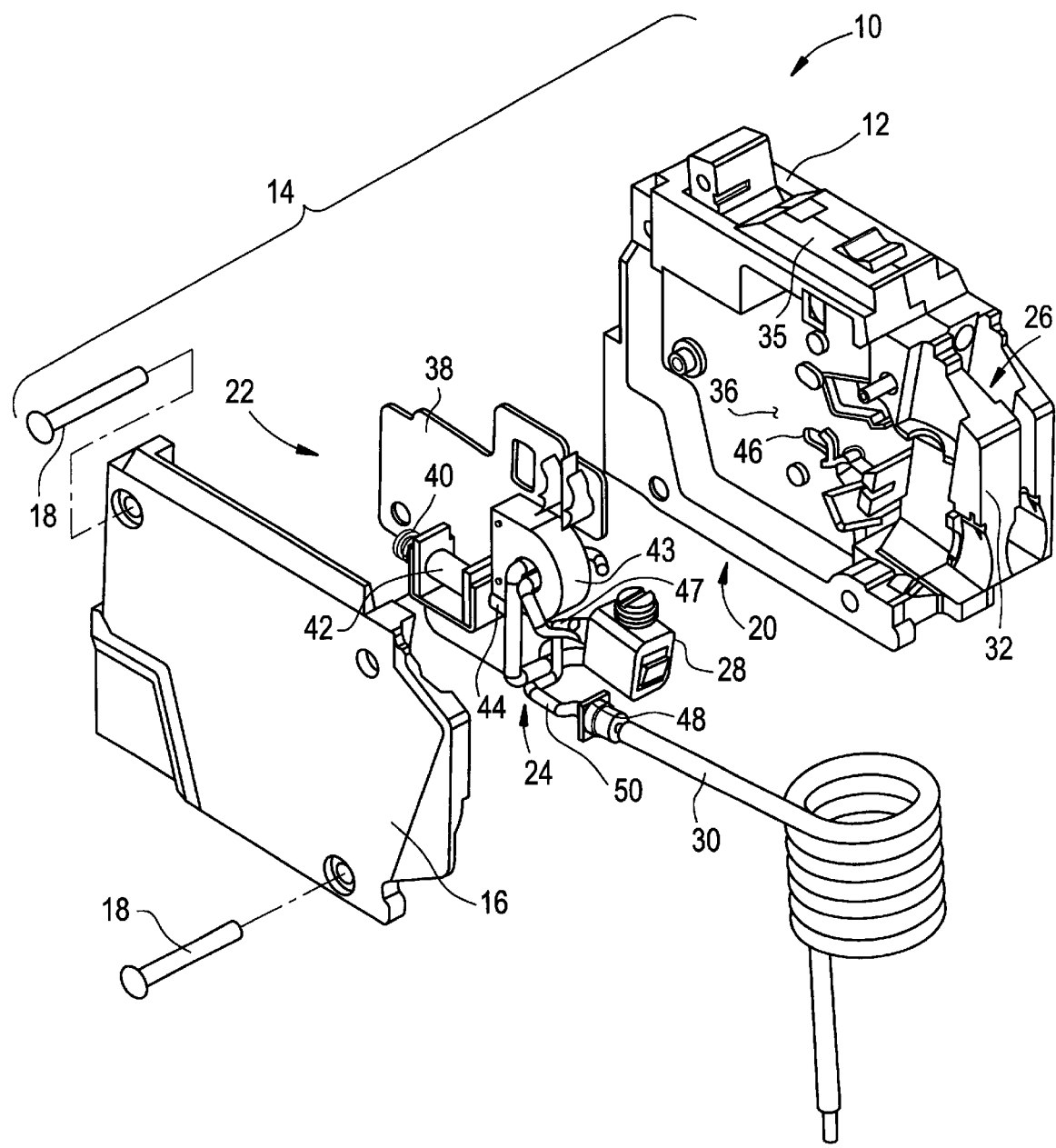
FIG. 2 is a perspective partially exploded view of the circuit breaker of FIG. 1.

Referring to FIGS. 1 and 2, an arc fault circuit breaker in accordance with the present invention is shown generally at 10. Circuit breaker 10 comprises a first housing 12, a second housing 14, and a cover 16 that are assembled securely together with a plurality of rivets or other tamper resistant fastners 18. First housing 12 defines a mechanical compartment, having load current carrying and switching components disposed therein (collectively referred to herein as a mechanical sub-assembly), as is well known. Second housing 14 defines an electronics compartment 20, having current sensing components 22 and neutral current carrying components 24 disposed therein (collectively, the current sensing components 22 and the neutral current carrying components 24 are referred to herein as an electronics sub-assembly 25). A load current from a source (not shown) is connected to a line connection and conducted through current carrying and switching components in the mechanical compartment to a load lug 26 for customer connection to a load (not shown). A neutral current from the load connects to neutral lug 28, and conducts along the neutral current carrying components 24 to neutral return wire 30 for customer connection to the source. Arc faults are sensed and processed by sensing components 22.

The mechanical compartment is the same as in the prior art with reference being by to U.S. Pat. No. 5,818,671 (which is incorporated by reference) for a detailed description thereof.

The electronics compartment 20 is defined by the second housing 14. The second housing 14 is generally rectangular in shape and comprised of electrical insulative material, i.e., plastic. Second housing 14 includes an insulative tab 32, a rim 35, and side wall 36. Tab 32 protrudes forwardly from the front of second housing 14 adjacent neutral lug 28 to provide an insulative barrier. Rim 35 extends around the periphery of side wall 36.

Figure 4:
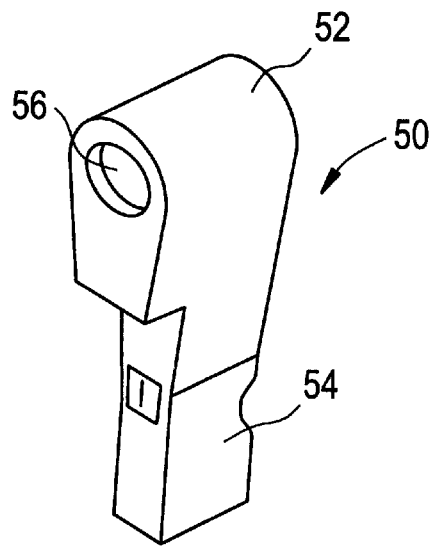
FIG. 4 is a perspective view of a plunger arm in accordance with the prior art.

Referring to FIG. 4, a plunger arm in accordance with the prior art is generally shown at 50. Plunger arm 50 comprises a mounting portion 52 and an arm portion 54. A mounting hole 56 is provided in portion 52 for receiving a plunger shaft.

Figure 6:
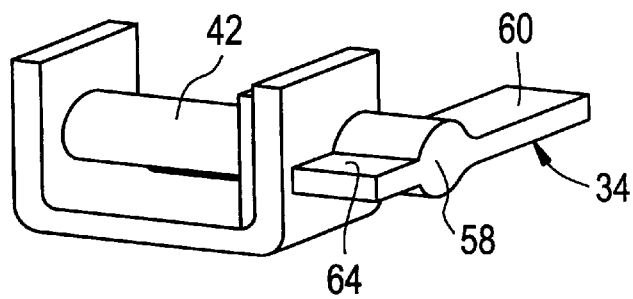
FIG. 6 is a perspective view of the solenoid and plunger arm in the circuit breaker of FIG. 1.
Figure 5:
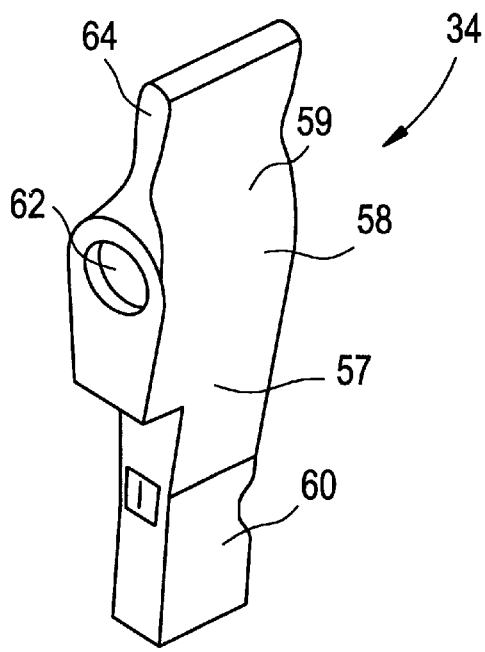
FIG. 5 is a perspective view of the plunger arm in the circuit breaker of FIG. 1.

Referring to FIGS. 5 and 6, the plunger arm 34 of the present invention comprises a mounting portion 58 and an arm portion 60, as in the prior art. The mounting portion 58 includes a first end 57 from which the arm portion 60 extends and a second end 59. As is known, it is arm portion 60 that extends through slot 46 to interact with the mechanical compartment. A mounting hole 62 is provided in portion 58 for receiving plunger shaft 42, again as in the prior art. In the prior art, the second 59 would define an end of the plunger arm 50, however, in accordance with an exemplary embodiment of the present invention, a protrusion 64 depends from second end 59 of portion 58 in a direction generally opposite that of arm portion 60. It will be appreciated that plunger arm 34 with protrusion 64 is preferably an integrally molded plastic member.

This protrusion 64 is used as a guide by an assembler, who may place one finger on protrusion 64 while holding the electronics sub-assembly 25. As the assembler applies a light downward force on the plunger arm 34, the plunger arm 34 tends to assume a position at right angles to the surface of the printed circuit board 38 (FIG. 2). When the electronics sub-assembly 25 is mated with the mechanical sub-assembly, the plunger arm 34 is properly aligned and it drops into the slot 46. If the electronics sub-assembly 25 is slightly offset, the assembler's finger on the protrusion can move the plunger arm 34 slightly to align the plunger arm for insertion in slot 46. Thus, the present invention enables an assembler to hold and guide the plunger arm 34 into the correct position with one hand while assembling the circuit breaker 10.

Current sensing components 22 include a circuit board 38 which is electrically connected to a solenoid 40 and a current sensing transformer 43. Upon receiving signals indicative of an arc fault, circuit board 38 provides a trip signal to trip the arc fault circuit breaker 10.

Figure 3:
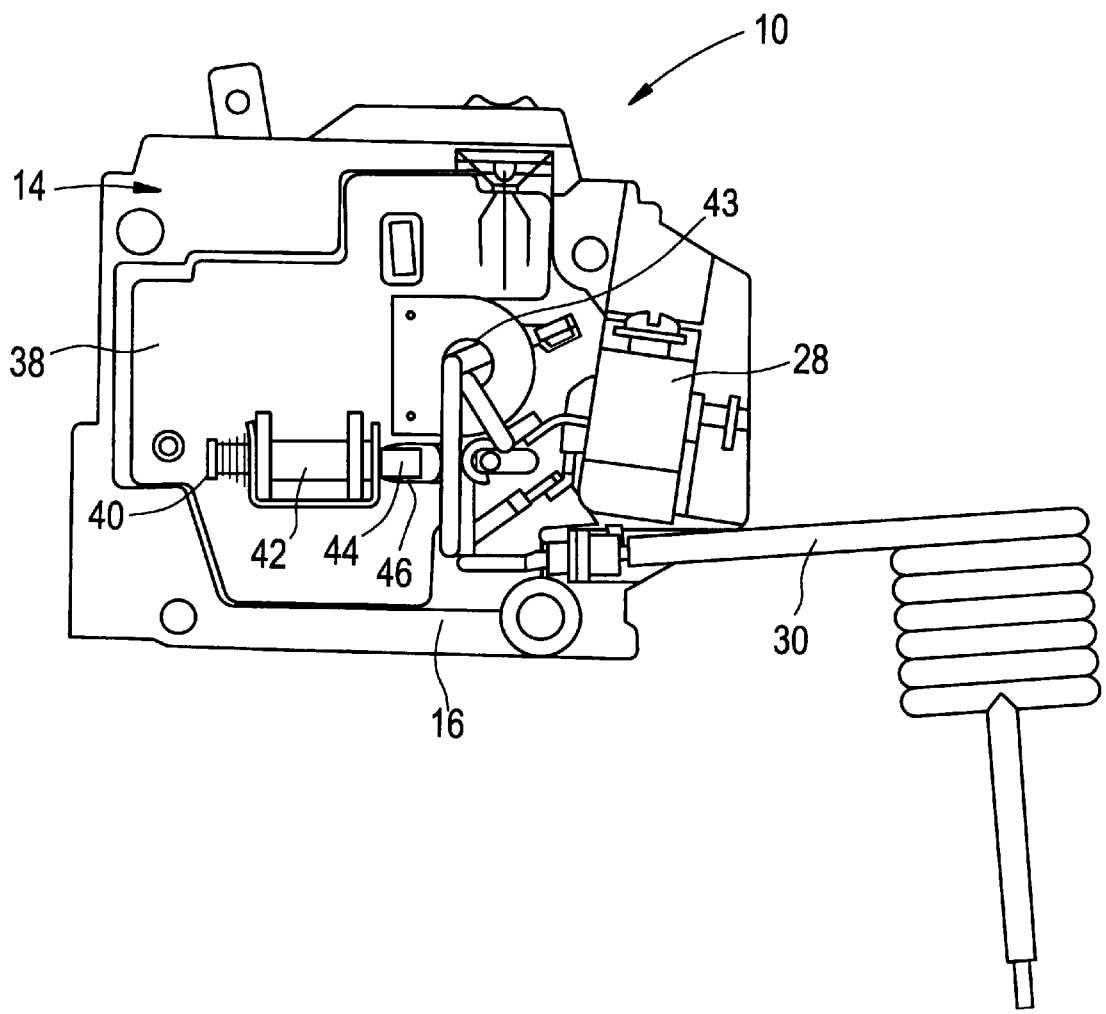
FIG. 3 is a side elevation view of the circuit breaker of FIG. 1 with the cover removed, thereby exposing to view the electronics compartment.

Also referring to FIG. 3, solenoid 40 has a plunger shaft 42 with a right angle plunger arm 44 (FIG. 6) depending therefrom. As is known, plunger arm 34 provides the means to trip the circuit breaker 10 under arc fault conditions. The plunger arm 34 extends into the mechanical compartment through a slot 46 inside wall 36. That is when an arc fault is sensed, circuit board 38 generates a trip signal to actuate solenoid 40, which (via plunger shaft 42) causes the plunger arm 34 to act which in turn acts on contacts in the mechanical compartment to open the load current path.

The neutral current carrying components 24 within the electronics compartment 20 are electrically connected, e.g., welded, bolted, or crimped, to form a neutral current path for the neutral current. The neutral current path begins at neutral lug 28 where the neutral current enters the electronics compartment 20. Neutral lug 28 secures the neutral lead connected to the load against neutral terminal which is connected to a conductor 47 to provide electrical continuity thereto. The neutral terminal is electrically connected to neutral return wire 30 via a connection 48 and conductor 50.

Both conductors 50 and 47 (the neutral current path and the load current path, respectively) are routed through the current sensing transformer 43 to sense arcing from line to ground as is well known. This is accomplished by routing the flow of the neutral current through the sensing transformer 43 in the opposite direction to the flow of the load current. The total current flow through sensing transformer 43 thus cancels unless an external ground fault current is caused by arcing from line to ground. The resulting differential signal, sensed by sensing transformer 43, is indicative of the ground fault current and is processed by circuit board 38, in a known manner.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A circuit breaker comprising:
   a first housing having mechanical components of said circuit breaker disposed therein; and
   a second housing having electronic components of said circuit breaker disposed therein, said second housing attaching with said first housing to allow said electronic and mechanical components to interact;
   a wall separating said first housing and said second housing, a slot in said wall;
   said electronic components including,
      a solenoid;
      a shaft extending from and driven by said solenoid, said shaft having a shaft axis; and,
      an arm having a longitudinal axis perpendicular to said shaft axis, said arm having a mounting portion for engaging with said shaft, said arm rotatable about the shaft axis of the shaft, the mounting portion having a first end and a second end, opposite the first end, the first end and the second end of the mounting portion lying along said longitudinal axis, said arm also having an arm portion extending from the first end of said mounting portion and along said longitudinal axis, said arm portion sized for passage through said slot in said wall, said arm portion attached and connected exclusively to said mounting portion, and said arm further having a protrusion extending from said second end of said mounting portion, said protrusion attached and connected exclusively to said mounting portion, wherein movement of said protrusion rotates said arm about the shaft axis of said shaft for aligning said arm portion with said slot.

2. The circuit breaker of claim 1 wherein said arm portion, said mounting portion, and said protrusion comprise an integrally molded plastic member.

3. The circuit breaker of claim 1 wherein the circuit breaker is an arc fault circuit breaker.

4. The circuit breaker of claim 1 wherein the protrusion has a rectangularly shaped cross-section.

5. The circuit breaker of claim 1 wherein the mounting portion includes a mounting hole for receiving the shaft.

6. The circuit breaker of claim 5 wherein the mounting portion has a bulbous periphery surrounding the mounting hole.

* * * * *